United States Patent
Choi et al.

(10) Patent No.: US 10,721,059 B2
(45) Date of Patent: Jul. 21, 2020

(54) APPARATUS AND METHOD FOR DATA ENCRYPTION, APPARATUS AND METHOD FOR DATA DECRYPTION

(71) Applicant: SAMSUNG SDS CO., LTD., Seoul (KR)

(72) Inventors: Kyu-Young Choi, Seoul (KR); Ji-Hoon Cho, Seoul (KR); Duk-Jae Moon, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 182 days.

(21) Appl. No.: 15/606,742

(22) Filed: May 26, 2017

(65) Prior Publication Data

US 2017/0346624 A1 Nov. 30, 2017

(30) Foreign Application Priority Data

May 27, 2016 (KR) .................. 10-2016-0065813

(51) Int. Cl.
*H04L 9/08* (2006.01)
*H04L 9/00* (2006.01)
*H04L 9/06* (2006.01)

(52) U.S. Cl.
CPC .......... *H04L 9/0822* (2013.01); *H04L 9/003* (2013.01); *H04L 9/0631* (2013.01); *H04L 2209/24* (2013.01)

(58) Field of Classification Search
CPC ..... H04L 9/0822; H04L 9/003; H04L 9/0631; H04L 2209/24
See application file for complete search history.

(56) References Cited

U.S. PATENT DOCUMENTS

| 2008/0123859 A1* | 5/2008 | Mamidwar | H04L 9/0625 380/278 |
| 2009/0323952 A1* | 12/2009 | Smith | H04B 7/18589 380/255 |
| 2014/0192976 A1* | 7/2014 | Yoon | H04L 9/0847 380/44 |
| 2016/0080114 A1 | 3/2016 | Choi et al. | |

FOREIGN PATENT DOCUMENTS

| CN | 101739531 A | 6/2010 |
| CN | 101753292 A | 6/2010 |
| CN | 103684787 A | 3/2014 |
| CN | 103795533 A | 5/2014 |

OTHER PUBLICATIONS

Choi, et al.; "Constructions Efficient PAKE Protocols from Identity-Based KEM/DEM", Jun. 19, 2015, 14 pages total.
Communication dated Nov. 12, 2019 issued by the State Intellectual Property Office of P.R. China in counterpart Chinese Application No. 201710383050.6.

* cited by examiner

*Primary Examiner* — Ayoub Alata
(74) *Attorney, Agent, or Firm* — Sughrue Mion, PLLC

(57) ABSTRACT

Disclosed are an apparatus and method for data encryption and an apparatus and method for data decryption. The data encryption apparatus includes a key exchanger configured to generate a session key using a key exchange protocol, a cipher key generator configured to generate at least one of a cipher key and a key table from the session key, and an encryptor configured to encrypt data with the at least one of the cipher key and the key table generated from the session key.

12 Claims, 30 Drawing Sheets

APPARATUS AND METHOD FOR DATA ENCRYPTION, APPARATUS AND METHOD FOR DATA DECRYPTION

CROSS-REFERENCE TO RELATED APPLICATION

This application claims priority to and the benefit of Korean Patent Application No. 10-2016-0065813, filed on May 27, 2016, the disclosure of which is incorporated herein by reference in its entirety.

BACKGROUND

1. Field

Embodiments of the present disclosure relate to data encryption and decryption technology.

2. Discussion of Related Art

A conventional encryption communication method performs a key exchange to generate a session key and performs an encryption communication using only the session key.

In detail, only security communication participants generate or exchange a session key for each session through a key exchange protocol in order to change a cipher key required for an encryption communication in units of a session and then use the changed cipher key and perform a full-scale encryption communication using the session keys as a cipher key of a symmetric-key cipher algorithm such as the AES.

In this case, a session period is set in terms of policy and is set in any unit from minutes to years. Also, during a session in which a policy for a unit of a session period is determined, a generated session key is fixed and used.

Accordingly, when a session key for a specific session is revealed, confidentiality of data encrypted during the session is reduced.

SUMMARY

Embodiments of the present disclosure are directed to providing an apparatus and method for encrypting and decrypting data.

According to an aspect of the present disclosure, there is provided a data encryption apparatus including a key exchanger configured to generate a session key using a key exchange protocol, a cipher key generator configured to generate at least one of a cipher key and a key table from the session key, and an encryptor configured to encrypt data with the at least one of the cipher key and the key table generated from the session key.

The encryptor may encrypt at least a portion of the data with a first cipher algorithm that uses a plurality of key tables, and the plurality of key tables may include the key table generated from the session key.

The plurality of key tables may further include a key table independent of the session key.

The encryptor may encrypt a seed value for encrypting the data or a portion of the data with the first cipher algorithm and encrypt the remaining portion of the data, which is not encrypted with the first cipher algorithm, with a second cipher algorithm that uses the cipher key or the session key.

The plurality of key tables may include only key tables independent of the session key, and the encryptor may encrypt a seed value for encrypting the data or a portion of the data with the first cipher algorithm and encrypt the remaining portion of the data, which is not encrypted with the first cipher algorithm, with a second cipher algorithm that uses the cipher key.

The encryptor may use the portion of the data or the seed value to encrypt the remaining portion.

According to another aspect of the present disclosure, there is provided a data encryption method including generating a session key using a key exchange protocol, generating at least one of a cipher key and a key table from the session key, and encrypting data with the at least one of the cipher key and the key table generated from the session key.

The encrypting may include encrypting at least a portion of the data with a first cipher algorithm that uses a plurality of key tables, and the plurality of key tables may include the key table generated from the session key.

The plurality of key tables may further include a key table independent of the session key.

The encrypting may include encrypting a seed value for encrypting the data or a portion of the data with the first cipher algorithm, and encrypting the remaining portion of the data, which is not encrypted with the first cipher algorithm, with a second cipher algorithm that uses the cipher key or the session key.

The plurality of key tables may include only key tables independent of the session key, and the encrypting may include encrypting a seed value for encrypting the data or a portion of the data with the first cipher algorithm, and encrypting the remaining portion of the data, which is not encrypted with the first cipher algorithm, with a second cipher algorithm that uses the cipher key.

The encrypting may include using the portion of the data or the seed value to encrypt the remaining portion.

According to another aspect of the present disclosure, there is provided a data decryption apparatus including a key exchanger configured to generate a session key using a key exchange protocol, a cipher key generator configured to generate at least one of a cipher key and a key table from the session key, and a decryptor configured to decrypt encrypted data with the at least one of the cipher key and the key table generated from the session key.

The decryptor may decrypt at least a portion of the encrypted data with a first cipher algorithm that uses a plurality of key tables, and the plurality of key tables may include the key table generated from the session key.

The plurality of key tables may further include a key table independent of the session key.

The decryptor may decrypt a portion of the encrypted data with the first cipher algorithm and decrypt the remaining portion of the encrypted data, which is not decrypted with the first cipher algorithm, with a second cipher algorithm that uses the cipher key or the session key.

The plurality of key tables may include only key tables independent of the session key, and the decryptor may decrypt a portion of the encrypted data with the first cipher algorithm and decrypt the remaining portion of the encrypted data, which is not decrypted with the first cipher algorithm, with a second cipher algorithm that uses the cipher key.

The decryptor may use the portion of the data decrypted with the first cipher algorithm to decrypt the remaining portion.

According to another aspect of the present disclosure, there is provided a data decryption method including generating a session key using a key exchange protocol, generating at least one of a cipher key and a key table from the session key, and decrypting encrypted data with the at least one of the cipher key and the key table generated from the session key.

The decrypting may include decrypting at least a portion of the encrypted data with a first cipher algorithm that uses a plurality of key tables, and the plurality of key tables may include the key table generated from the session key.

The plurality of key tables may further include a key table independent of the session key.

The decrypting may include decrypting a portion of the encrypted data with the first cipher algorithm and decrypting the remaining portion of the encrypted data, which is not decrypted with the first cipher algorithm, with a second cipher algorithm that uses the cipher key or the session key.

The plurality of key tables may include only key tables independent of the session key, and the decrypting may include decrypting a portion of the encrypted data with the first cipher algorithm and decrypting the remaining portion of the encrypted data, which is not decrypted with the first cipher algorithm, with a second cipher algorithm that uses the cipher key.

The decrypting may include using the portion of the data decrypted with the first cipher algorithm to decrypt the remaining portion.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only an example, and the present disclosure is not limited thereto.

Figure 1:
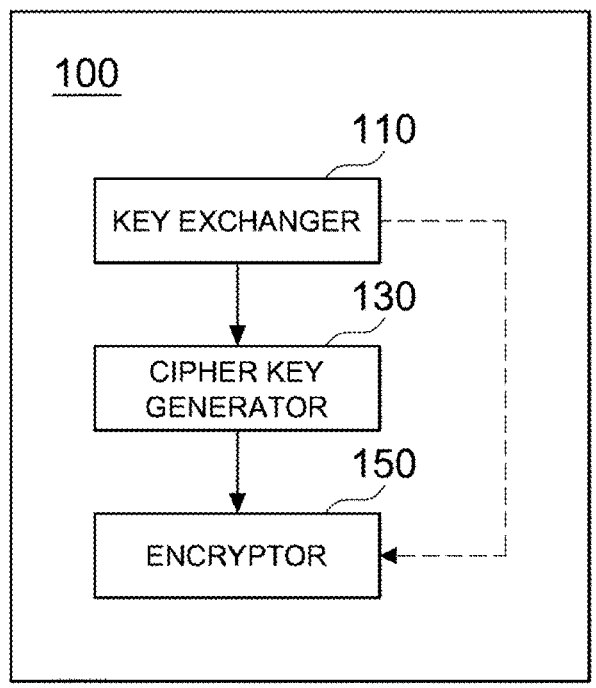
FIG. 1 is a block diagram of a data encryption apparatus according to an embodiment of the present disclosure.

In describing embodiments of the present disclosure, when it is determined that a detailed description of known techniques associated with the present disclosure would unnecessarily obscure the subject matter of the present disclosure, the detailed description thereof will be omitted. Also, terms used herein are defined in consideration of the functions of the present disclosure and may be changed depending on a user, the intent of an operator, or a custom. Accordingly, the terms must be defined based on the following overall description of this specification. The terminology used herein is for the purpose of only describing embodiments of the present disclosure and should not be restrictive. The singular forms "a," "an" and "the" are intended to include the plural forms as well, unless the context clearly indicates otherwise. It should be understood that the terms "comprises," "comprising," "includes" and/or "including" specify the presence of stated features, integers, steps, operations, elements, and/or components when used herein, but do not preclude the presence or addition of one or more other features, integers, steps, operations, elements, components, and/or groups thereof. FIG. 1 is a block diagram of a data encryption apparatus 100 according to an embodiment of the present disclosure.

Referring to FIG. 1, the data encryption apparatus 100 according to an embodiment of the present disclosure includes a key exchanger 110, a cipher key generator 130, and an encryptor 150.

The key exchanger 110 generates a session key using a key exchange protocol.

In this case, for example, a Diffie-Hellman key exchange algorithm based on a public key may be used as the key exchange protocol. However, the present disclosure is not necessarily limited thereto, and various well-known key exchange algorithms as well as the Diffie-Hellman key exchange algorithm may be used.

The cipher key generator 130 generates at least one of a cipher key and a key table from the session key generated by the key exchanger 110.

Hereinafter, the key table generated from the session key generated by the key exchanger 110 is referred to as a variable key table.

Figure 2:
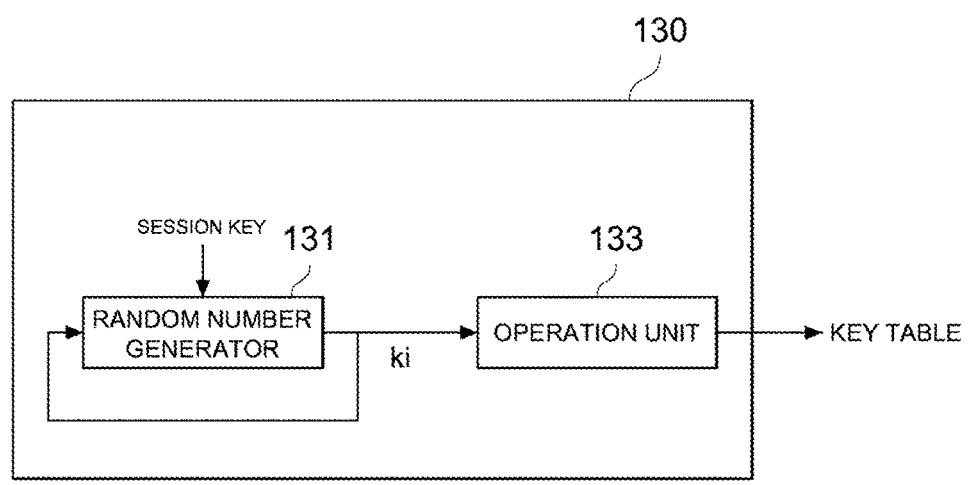
FIG. 2 is a detailed block diagram of a cipher key generator according to an embodiment of the present disclosure.

In detail, FIG. 2 is a detailed block diagram of the cipher key generator 130 according to an embodiment of the present disclosure.

Referring to FIG. 2, the cipher key generator 130 according to an embodiment of the present disclosure may include a random number generator 131 configured to generate a plurality of sub-keys from the session key and an operation unit 133 configured to generate a variable key table using each of the generated sub-keys.

The random number generator 131 may receive the session key generated by the key exchanger 110, generate a sub-key ki, and repeatedly generate a new sub-key from the generated sub-key ki.

For example, when it is assumed that three sub-keys are generated, the random number generator 131 may generate a random number from the received session key and generate a first sub-key. Subsequently, the random number generator 131 may generate a random number from the generated first sub-key and generate a second sub-key and then may generate a random number from the generated second sub-key and generate a third sub-key.

The operation unit 133 may generate random values for configuring a variable key table from the sub-keys generated by the random number generator 131 and generate a variable key table including the generated random values.

In detail, the operation unit 133 may generate random values by using a round function for generating a random value to apply each sub-key to the round function every round.

Figure 3:
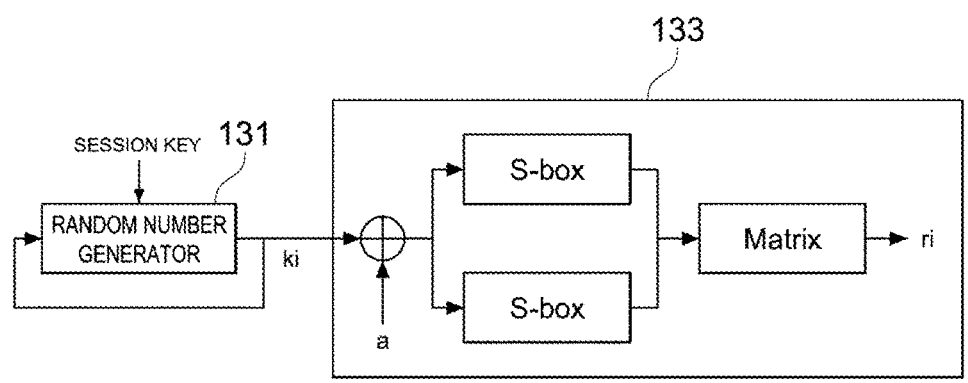
FIG. 3 is a diagram showing an example of a round function used in an operation unit.

In detail, FIG. 3 is a diagram showing an example of a round function used by the operation unit 133.

Referring to FIG. 3, the operation unit 133 may perform an XOR operation between the sub-key ki generated by the random number generator 131 and a random value a with the same size as the sub-key ki and may divide a result of the XOR operation into two parts and apply the two parts to respective S-boxes, Subsequently, the operation unit 133 may perform a matrix operation between output result values of the two S-boxes to generate a random value ri. In this case, various matrix operations with characteristics for maximizing diffusion effect on an input value, such as a matrix operation using a maximum distance separable (MDS) matrix, may be used as the matrix operation.

As described below, when the cipher key and the variable key table generated from the session key are all used for data encryption, the cipher key may be one of the sub-keys generated by the random number generator 131, and the variable key table may be generated by the operation unit 133 using the remaining sub-keys other than a sub-key used as the cipher key among the sub-keys generated by the random number generator 131.

Also, when only the cipher key generated from the session key is used for data encryption, the cipher key generator 130 may include only the random number generator 131 unlike the examples shown in FIGS. 2 and 3 and may use the sub-key generated by the random number generator 131 as the cipher key.

The generation of the cipher key and the variable key table performed by the cipher key generator 130 is not necessarily limited to the examples shown in FIGS. 2 and 3. For example, the cipher key generator 130 may generate at least one of the cipher key and the variable key table from the session key in various methods having a one-way property other than those shown in FIGS. 2 and 3.

The encryptor 150 encrypts data with at least one of the cipher key and the variable key table generated by the cipher key generator 130.

In detail, according to an embodiment of the present disclosure, the encryptor 150 may encrypt data with a first cipher algorithm for performing encryption with a plurality of key tables.

In this case, according to an embodiment of the present disclosure, the first cipher algorithm may be a symmetric-key cipher algorithm such as an Advanced Encryption Standard (AES) algorithm, a Data Encryption Standard (DES) algorithm, a 3DES algorithm, an International Data Encryption Algorithm (IDEA), and a Blowfish algorithm.

For example, the first cipher algorithm may be a white-box cipher algorithm based on the symmetric-key cipher algorithm.

Figure 4:
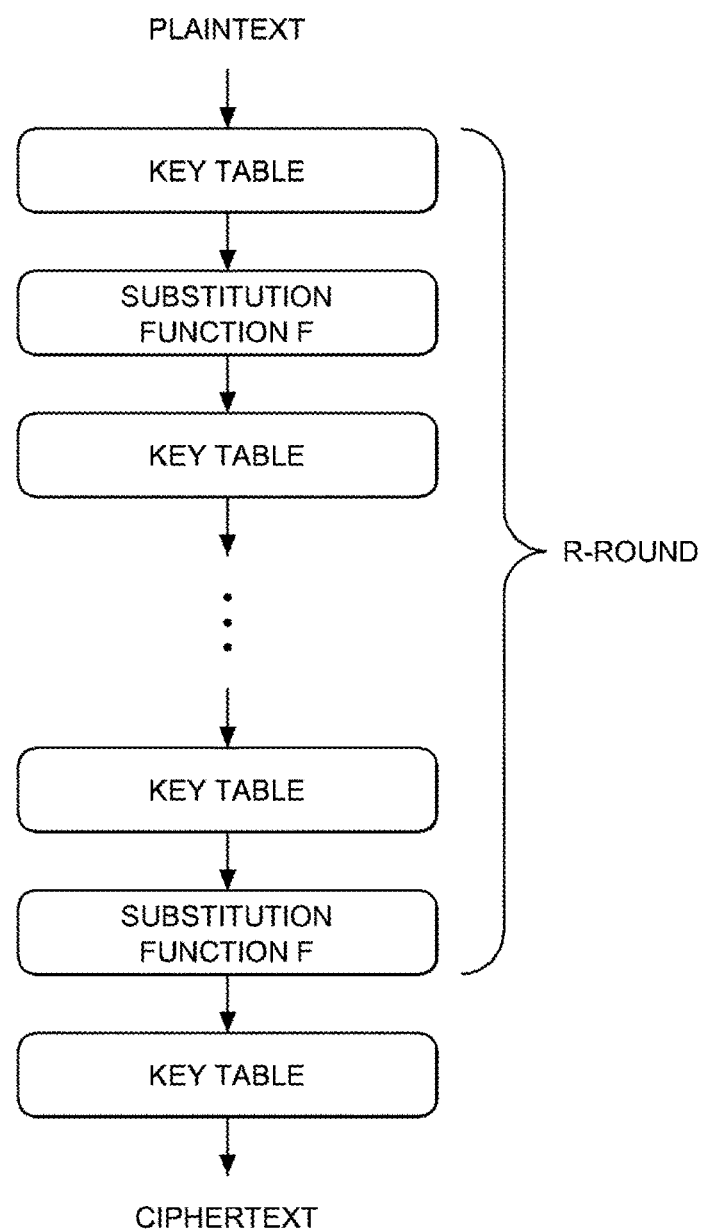
FIG. 4 is a diagram showing a structure of a first cipher algorithm according to an embodiment of the present disclosure.

As a detailed example, the first cipher algorithm may be a cipher algorithm generated by alternately and repeatedly combining a substitution function F and a plurality of key tables on the basis of the Even-Mansour scheme, as shown in FIG. 4. In this case, the substitution function F may refer to any form of function that is cryptographically safe and configured to output input values as different values having the same length. For example, the substitution function F may be a cipher algorithm such as an AES algorithm, a DES algorithm, a 3DES algorithm, an IDEA, and a Blowfish algorithm.

Figure 5:
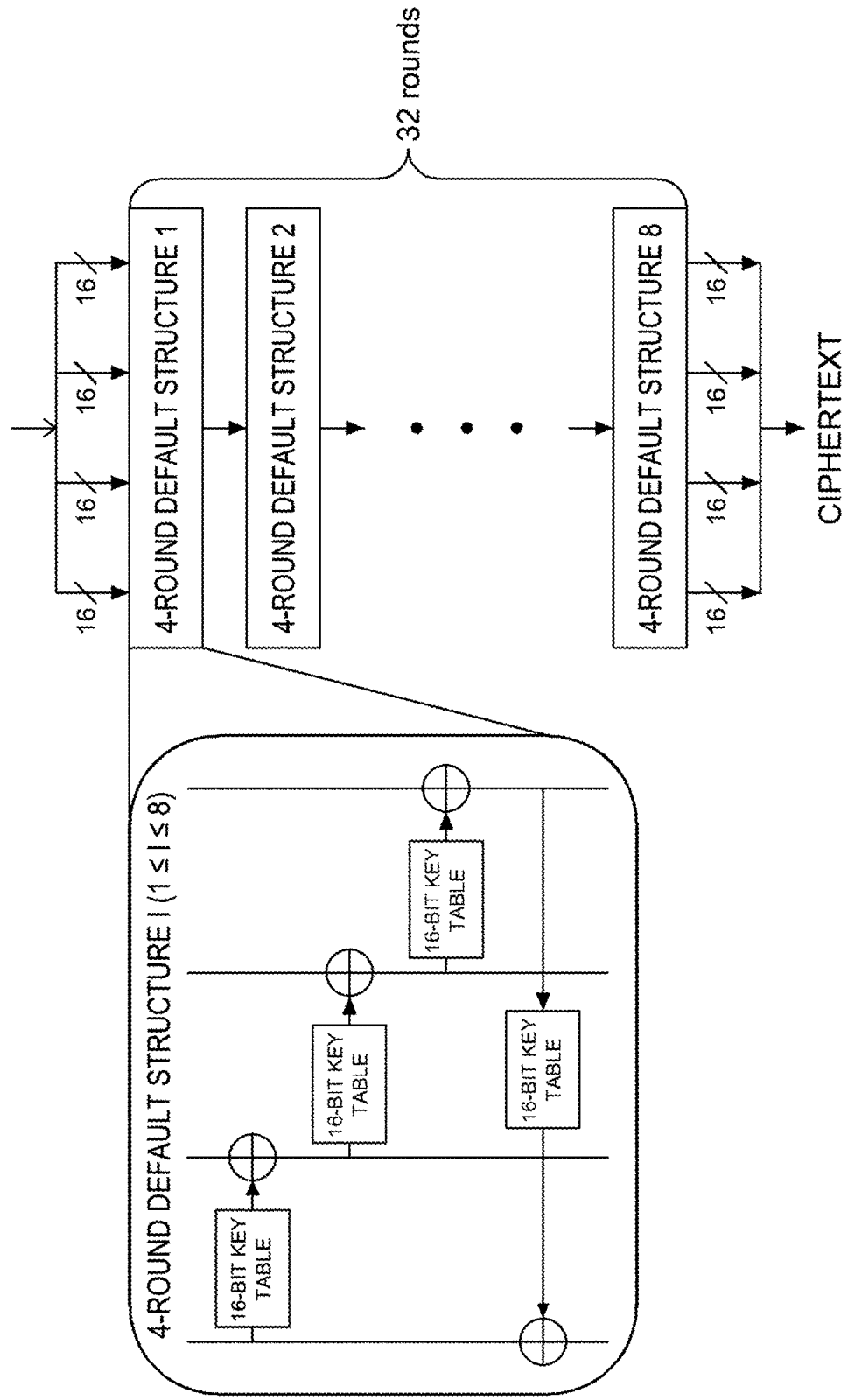
FIG. 5 is a diagram showing a structure of a first cipher algorithm according to another embodiment of the present disclosure.

As another example, the first cipher algorithm may be a cipher algorithm obtained by applying the key tables to each round function of a Feistel structure of a Feistel-structured cipher algorithm such as the DES algorithm as shown in FIG. 5.

However, in an embodiment of the present disclosure, the first cipher algorithm is not limited to the above-described example. In addition to the above example, for example, the first cipher algorithm may include various cipher algorithms configured to perform encryption or decryption using a plurality of key tables and configured to have a structure in which an algorithm changes with a change in at least one of the plurality of key tables.

Figure 6:
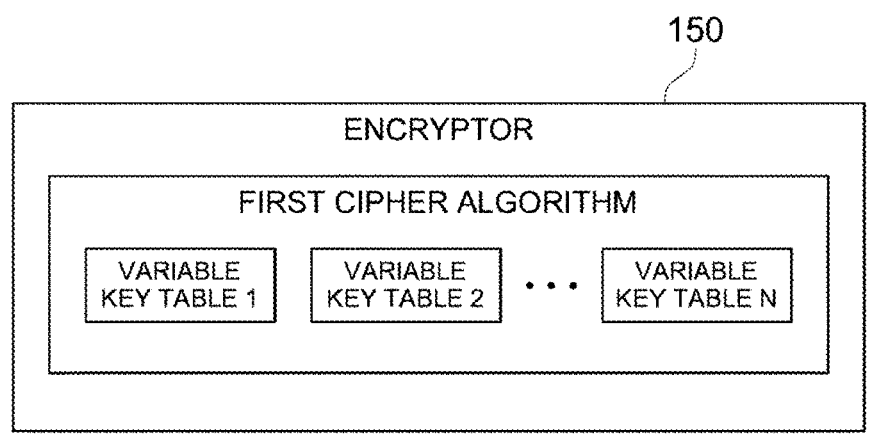
FIG. 6 is a diagram showing an example of an encryption method performed by an encryptor.

FIG. 6 is a diagram showing an example of an encryption method performed by the encryptor 150.

According to an embodiment of the present disclosure, the encryptor 150 may encrypt data with a first cipher algorithm that uses a plurality of variable key tables, as shown in FIG. 6.

In this case, the plurality of variable key tables may be the same key table, but are not necessarily limited thereto. The plurality of variable key tables may be fully or partially different from each other depending on the embodiment.

For example, as shown in FIG. 6, N variable key tables may be all the same as each other. In this case, the cipher key generator 130 may generate one variable key table from a session key.

As another example, N variable key tables may be different from each other. In this case, the cipher key generator 130 may generate N variable key tables from a session key.

As still another example, when two of N variable key tables are the same as each other, the cipher key generator 130 may generate N-1 variable key tables from a session key.

Figure 7:
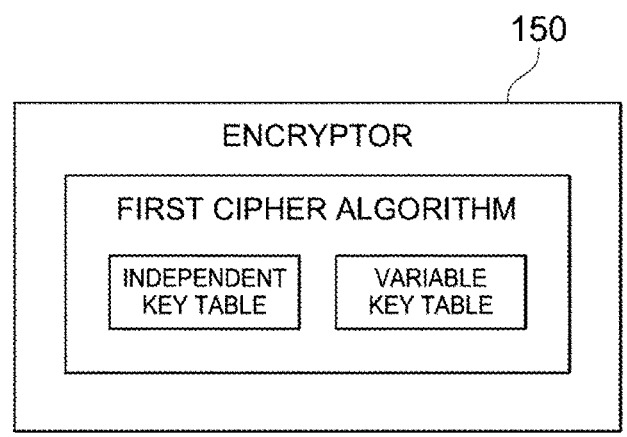
FIG. 7 is a diagram showing another example of an encryption method performed by an encryptor.

FIG. 7 is a diagram showing another example of an encryption method performed by the encryptor 150.

According to an embodiment of the present disclosure, the encryptor 150 may encrypt data with a first cipher algorithm that uses an independent key table and a variable key table, as shown in FIG. 7.

In this case, the independent key table refers to a key table that is independent of a session key generated by the key exchanger 110 (that is, not generated from the session key).

The first cipher algorithm shown in FIG. 7 uses one independent key table and one variable key table, but is not necessarily limited thereto.

For example, the encryptor 150 may encrypt data with a first cipher algorithm that uses one or more independent key tables and one or more variable key tables, unlike the example shown in FIG. 7.

In this case, the independent key tables may be all the same as each other, but are not necessarily limited thereto. The independent key tables may be fully or partially different from each other depending on the embodiment.

Likewise, the variable key tables may be all the same as each other, but are not necessarily limited thereto. The variable key tables may be fully or partially different from each other depending on the embodiment.

Figure 8:
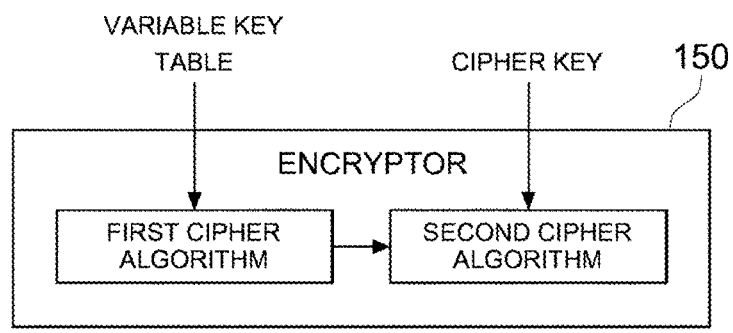
FIG. 8 is a diagram showing still another example of an encryption method performed by an encryptor.

FIG. 8 is a diagram showing still another example of an encryption method performed by the encryptor 150.

According to an embodiment of the present disclosure, as shown in FIG. 8, the encryptor 150 may encrypt data with a first cipher algorithm that uses a plurality of key tables including a variable key table and a second cipher algorithm that uses a cipher key generated by the cipher key generator 130.

In this case, for example, the second cipher algorithm may be a symmetric-key cipher algorithm such as an Advanced Encryption Standard (AES) algorithm, a Data Encryption Standard (DES) algorithm, a 3DES algorithm, an International Data Encryption Algorithm (IDEA), and a Blowfish algorithm.

In an example shown in FIG. 8, the plurality of key tables used in the first cipher algorithm may include only variable key tables, for example, as shown in FIG. 6.

As another example, the plurality of key tables used in the first cipher algorithm may include an independent key table and a variable key table as shown in FIG. 7.

Figure 9:
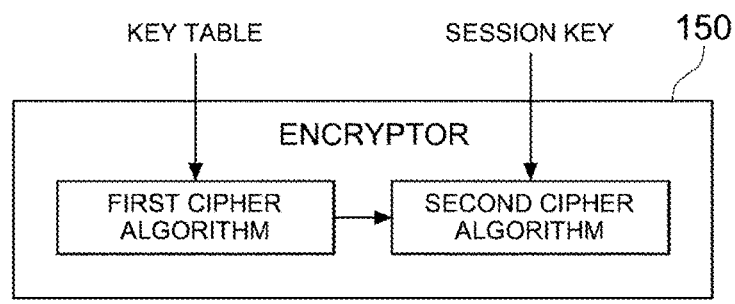
FIG. 9 is a diagram showing still another example of an encryption method performed by an encryptor.

FIG. 9 is a diagram showing still another example of an encryption method performed by the encryptor 150.

According to an embodiment of the present disclosure, as shown in FIG. 9, the encryptor 150 may encrypt data with a first cipher algorithm that uses a plurality of key tables including a variable key table and a second cipher algorithm that uses a session key generated by the key exchanger 110.

In an example shown in FIG. 9, the plurality of key tables used in the first cipher algorithm may include only variable key tables, for example, as shown in FIG. 6.

As another example, the plurality of key tables used in the first cipher algorithm may include an independent key table and a variable key table as shown in FIG. 7.

Figure 10:
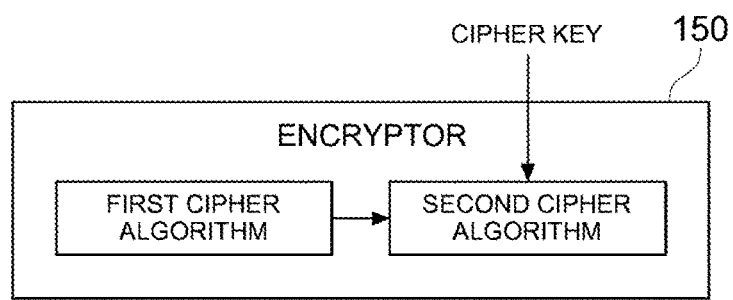
FIG. 10 is a diagram showing still another example of an encryption method performed by an encryptor.

FIG. 10 is a diagram showing still another example of an encryption method performed by the encryptor 150.

According to an embodiment of the present disclosure, as shown in FIG. 10, the encryptor 150 may encrypt data with a first cipher algorithm that uses a plurality of key tables and a second cipher algorithm that uses a cipher key generated by the cipher key generator 130.

In an example shown in FIG. 10, the plurality of key tables used in the first cipher algorithm may include, for example, only independent key tables. In this case, the independent key tables may be all the same as each other, but are not necessarily limited thereto. The independent key tables may be fully or partially different from each other depending on the embodiment.

According to an embodiment of the present disclosure, in the examples shown in FIGS. 8 to 10, the encryptor 150 may encrypt a seed value or a portion of the data with the first cipher algorithm and may encrypt the other portion of the data, which is not encrypted with the first cipher algorithm, with the second cipher algorithm.

Also, according to an embodiment of the present disclosure, the encryptor 150 may use the seed value or the portion of the data encrypted with the first cipher algorithm to encrypt the other portion of the data encrypted with the second cipher algorithm. In this case, the seed value may be an initialization vector (IV) or an initial counter value used in a block cipher operation mode to be described below.

In detail, the encryptor 150 may encrypt the data in units of a block, for example, by using the block cipher operation mode, which uses the first cipher algorithm and the second cipher algorithm.

In this case, the block cipher operation mode may be, for example, one of an Electronic Code Book (ECB) mode, a Cipher Block Chaining (CBC) mode, a Propagating Cipher Block Chaining (PCBC) mode, a Cipher FeedBack (CFB) mode, an Output FeedBack (OFB) mode, and a Counter (CTR) mode.

Figure 11:
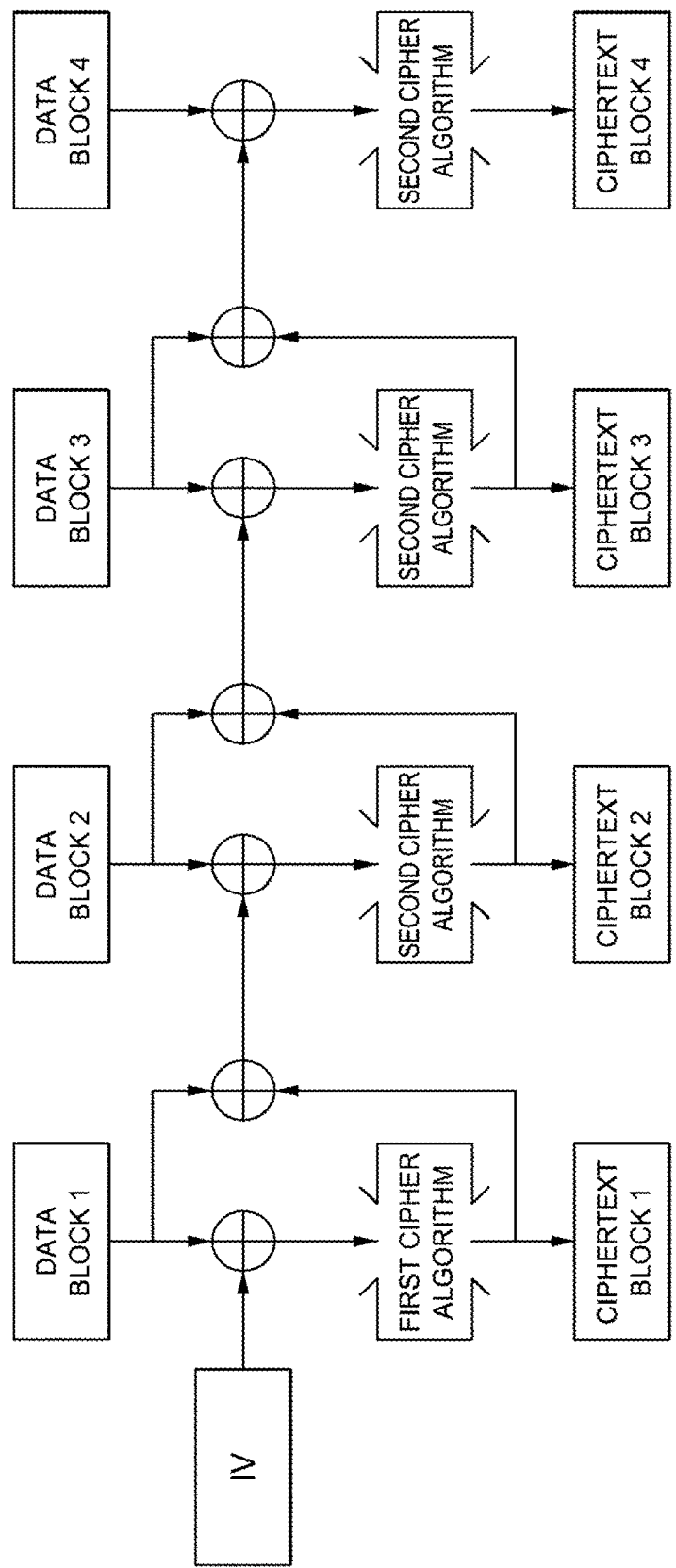
FIG. 11 is a diagram showing an example of encryption using a Propagating Cipher Block Chaining (PCBC) mode.

For example, as shown in FIG. 11, the encryptor 150 may perform encryption in the PCBC mode.

Referring to FIG. 11, the encryptor 150 may encrypt a first block of the data (data block 1) by performing an exclusive-OR (XOR) operation between data block 1 and the initialization vector IV and applying the first cipher algorithm to a result of the XOR operation.

Subsequently, the encryptor 150 may encrypt the remaining blocks of the data (data blocks 2 to 4) by performing an XOR operation between each of the remaining blocks and its previous data block and its previous ciphertext block and applying the second cipher algorithm to a result of the XOR operation.

Figure 12:
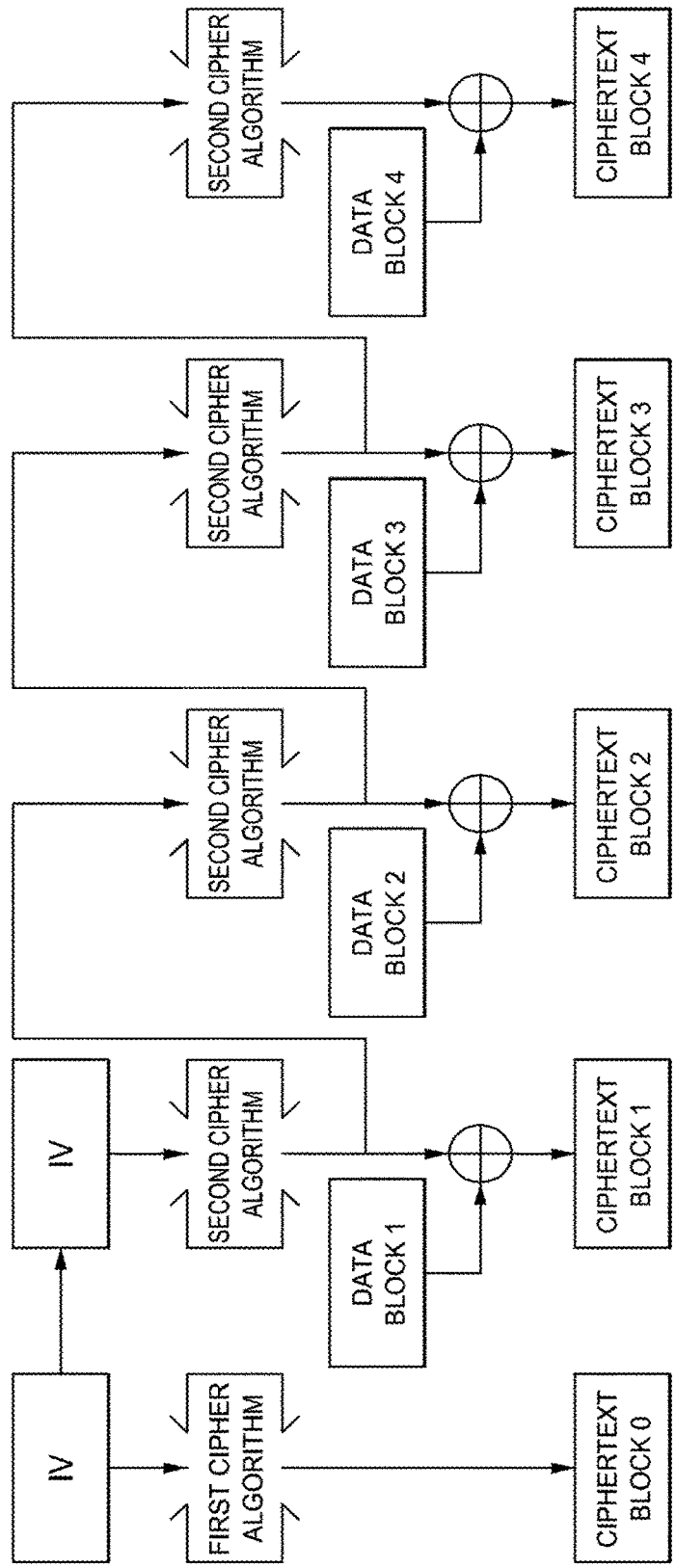
FIG. 12 is a diagram showing an example of encryption using an Output Feedback (OFB) mode.

As another example, the encryptor 150 may perform encryption in the OFB mode, as shown in FIG. 12.

Referring to FIG. 12, the encryptor 150 may encrypt the initialization vector IV with the first cipher algorithm.

Subsequently, the encryptor 150 may encrypt each block of the data (data blocks 1 to 4) with the second cipher algorithm. In detail, the encryptor 150 may encrypt the initialization vector IV with the second cipher algorithm to generate a first output block and then perform an XOR operation between the first output block and the first block of the data (data block 1) to generate ciphertext block 1.

Subsequently, the encryptor 150 may encrypt an $(i-1)^{th}$ output block with the second cipher algorithm to generate an $i^{th}$ output block and then perform an XOR operation between the $i^{th}$ output block and an $i^{th}$ block of the data to generate an $i^{th}$ ciphertext block.

Figure 13:
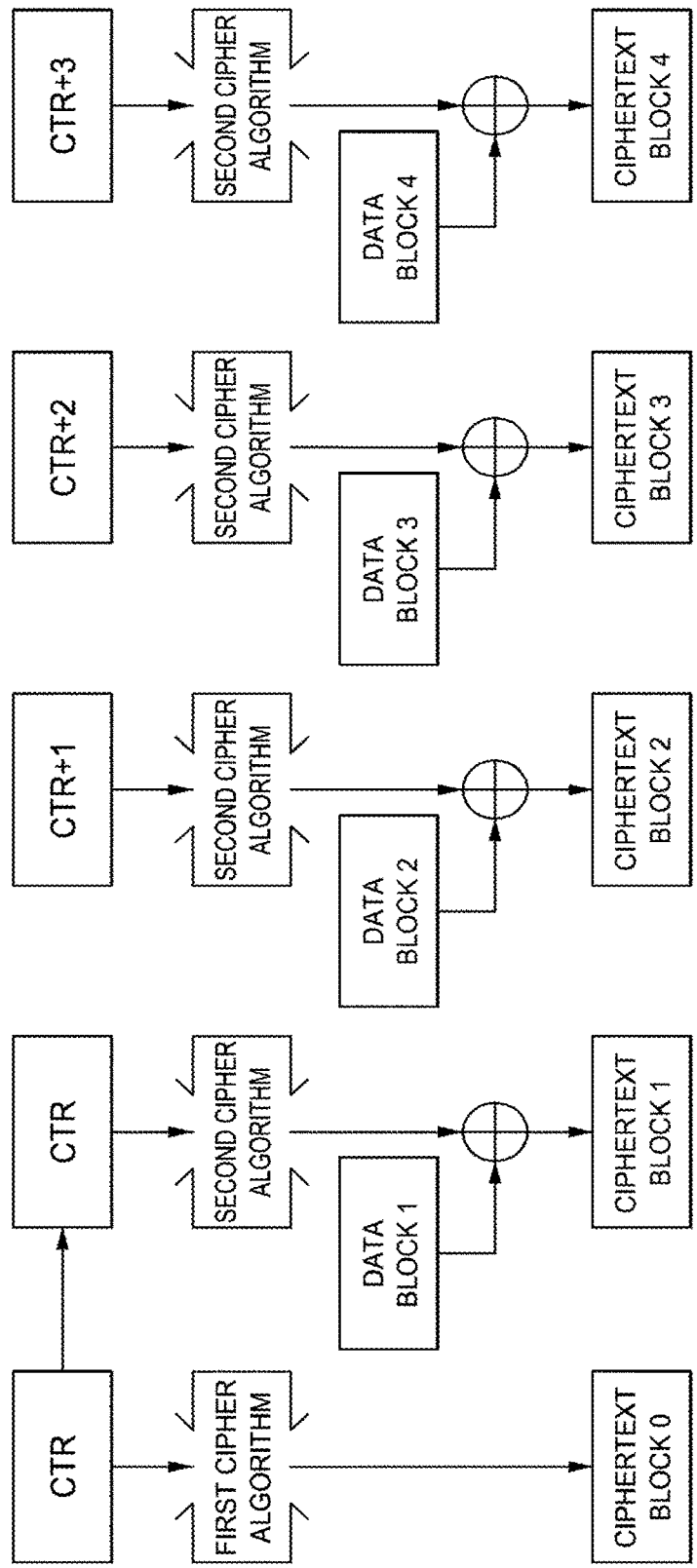
FIG. 13 is a diagram showing an example of encryption using a Counter (CTR) mode.

As still another example, the encryptor 150 may perform encryption in the CTR mode, as shown in FIG. 13.

Referring to FIG. 13, the encryptor 150 may encrypt the initial counter value CTR with the first cipher algorithm to generate ciphertext block 0.

Subsequently, the encryptor 150 may encrypt each block of the data with the second cipher algorithm to generate ciphertext blocks 1 to 4. In detail, the encryptor 150 may encrypt the initial counter value CTR with the second cipher algorithm and then perform an XOR operation between the encrypted counter value and the first block of the data (data block 1) to generate ciphertext block 1. Likewise, the encryptor 150 may encrypt an $i^{th}$ counter value (i.e., CTR+i−1) with the second cipher algorithm and then perform an XOR operation between the encrypted counter value and the $i^{th}$ block of the data to generate an $i^{th}$ ciphertext block.

The operation modes shown in FIGS. 11 to 13 are illustrative and thus are not necessarily limited to the shown examples. Accordingly, the operation modes may be modified in various ways other than the shown examples.

In an embodiment of the present disclosure, the key exchanger 110, the cipher key generator 130, and the encryptor 150 may be implemented in a computing apparatus including at least one processor and a computer-readable recording medium connected with the processor. The computer-readable recording medium may be disposed inside or outside the processor, and may be connected with the processor using various well-known means. The processor in the computing apparatus may enable the computing apparatus to operate according an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 14:
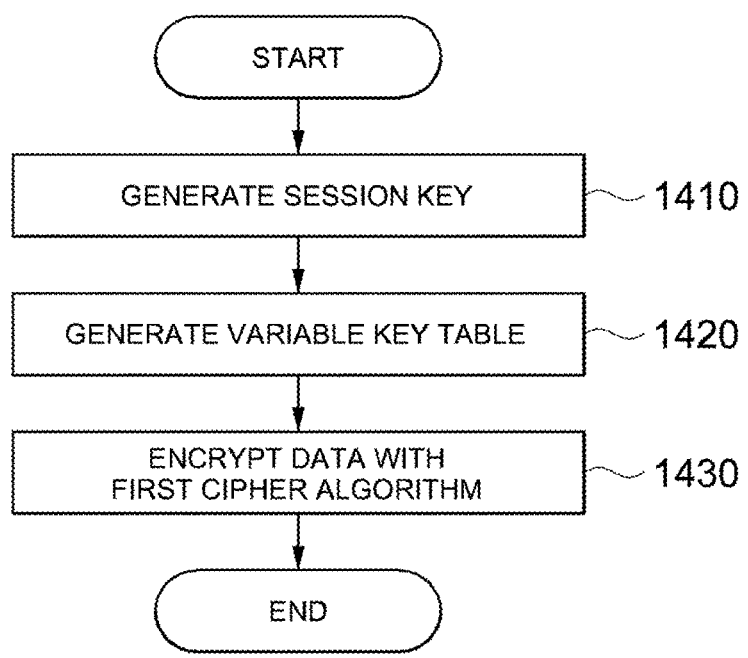
FIG. 14 is a flowchart of a data encryption method according to an embodiment of the present disclosure.

FIG. 14 is a flowchart of a data encryption method according to an embodiment of the present disclosure.

For example, the data encryption method shown in FIG. 14 may be performed by the data encryption apparatus 100 shown in FIG. 1.

Referring to FIG. 14, the data encryption apparatus 100 generates a session key using a key exchange protocol (1410).

Subsequently, the data encryption apparatus 100 generates a variable key table from the session key (1420).

Subsequently, the data encryption apparatus 100 encrypts data with a first cipher algorithm that uses a plurality of key tables including the generated variable key table (1430).

In detail, according to an embodiment of the present disclosure, the plurality of key tables may include only variable key tables. In this case, the variable key tables may be all the same as each other, but are not necessarily limited thereto. The variable key tables may be fully or partially different from each other depending on the embodiment.

According to another embodiment of the present disclosure, the plurality of key tables may include one or more independent key tables and one or more variable key tables.

In this case, the independent key tables may be the same key table, but are not necessarily limited thereto. The independent key tables may be fully or partially different from each other depending on the embodiment.

Likewise, the variable key tables may be the same key table, but are not necessarily limited thereto. The variable key tables may be fully or partially different from each other depending on the embodiment.

Figure 15:
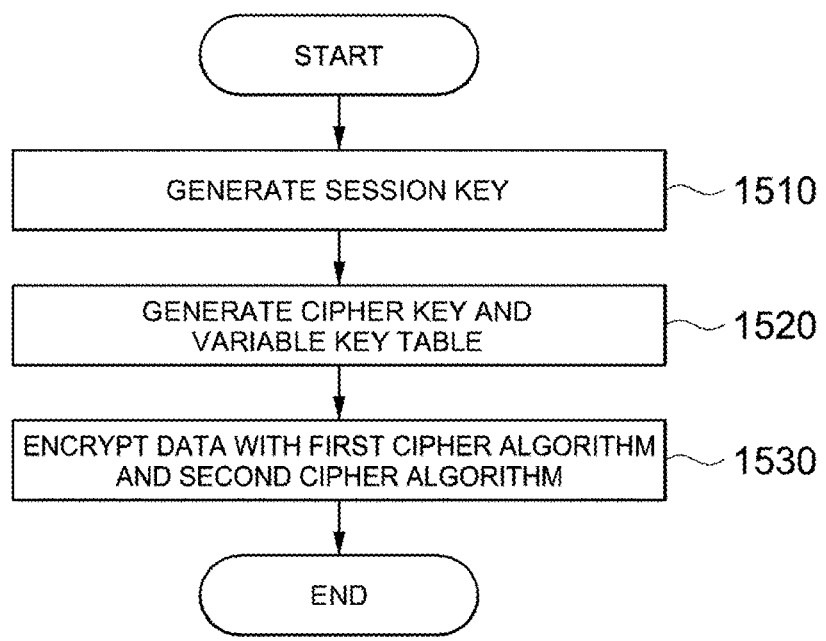
FIG. 15 is a flowchart of a data encryption method according to another embodiment of the present disclosure.

FIG. 15 is a flowchart of a data encryption method according to another embodiment of the present disclosure.

For example, the data encryption method shown in FIG. 15 may be performed by the data encryption apparatus 100 shown in FIG. 1.

Referring to FIG. 15, the data encryption apparatus 100 generates a session key using a key exchange protocol (1510).

Subsequently, the data encryption apparatus 100 generates a cipher key and a variable key table from the session key (1520).

Subsequently, the data encryption apparatus 100 encrypts data with a first cipher algorithm that uses a plurality of key tables including the generated variable key table and a second cipher algorithm that uses the generated cipher key (1530).

In detail, according to an embodiment of the present disclosure, the data encryption apparatus 100 may encrypt a seed value or a portion of the data with the first cipher algorithm and may encrypt the other portion of the data, which is not encrypted with the first cipher algorithm, with the second cipher algorithm.

For example, the data encryption apparatus 100 may encrypt the data according to a block cipher operation mode that uses the first cipher algorithm and the second cipher algorithm. In this case, the block cipher operation mode may be configured so that the seed value or the portion of the data, which is encrypted with the first cipher algorithm, is used to encrypt the other portion with the second cipher algorithm.

For example, the data encryption apparatus 100 may encrypt the seed value or the portion of the data with a first cipher algorithm that uses only variable key tables. In this case, the plurality of variable key tables may be the same key table, but are not necessarily limited thereto. The plurality of variable key tables may be fully or partially different from each other depending on the embodiment.

As another example, the data encryption apparatus 100 may encrypt the seed value or the portion of the data with a first cipher algorithm that uses one or more independent key tables and one or more variable key tables. In this case, the independent key tables may be the same key table, but are not necessarily limited thereto. The independent key tables may be fully or partially different from each other depending on the embodiment.

Likewise, the variable key tables may be the same key table, but are not necessarily limited thereto. The variable key tables may be fully or partially different from each other depending on the embodiment.

Figure 16:
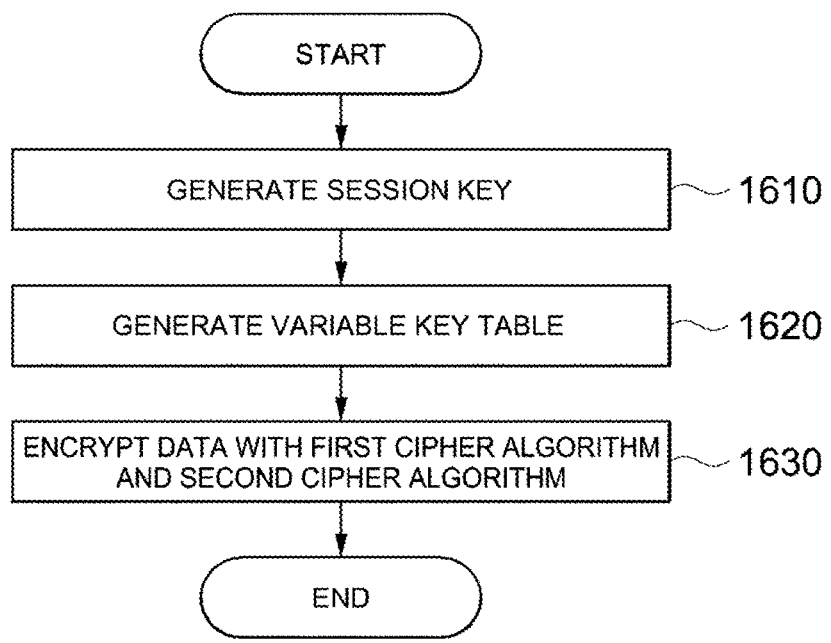
FIG. 16 is a flowchart of a data encryption method according to still another embodiment of the present disclosure.

FIG. 16 is a flowchart of a data encryption method according to still another embodiment of the present disclosure.

For example, the data encryption method shown in FIG. 16 may be performed by the data encryption apparatus 100 shown in FIG. 1.

Referring to FIG. 16, the data encryption apparatus 100 generates a session key using a key exchange protocol (1610).

Subsequently, the data encryption apparatus 100 generates a variable key table from the session key (1620).

Subsequently, the data encryption apparatus 100 encrypts data with a first cipher algorithm that uses a plurality of key tables including the generated variable key table and a second cipher algorithm that uses the session key (1630).

In detail, according to an embodiment of the present disclosure, the data encryption apparatus 100 may encrypt a seed value or a portion of the data with the first cipher algorithm and may encrypt the other portion of the data, which is not encrypted with the first cipher algorithm, with the second cipher algorithm.

For example, the data encryption apparatus 100 may encrypt the data according to a block cipher operation mode that uses the first cipher algorithm and the second cipher algorithm. In this case, the block cipher operation mode may be configured so that the seed value or the portion of the data, which is encrypted with the first cipher algorithm, is used to encrypt the other portion with the second cipher algorithm.

For example, according to an embodiment of the present disclosure, the data encryption apparatus 100 may encrypt the seed value or the portion of the data with a first cipher algorithm that uses only variable key tables. The plurality of key tables may include only variable key tables. In this case, the variable key tables may be all the same as each other or fully or partially different from each other.

According to another embodiment of the present disclosure, the plurality of key tables may include one or more independent key tables and one or more variable key tables.

In this case, the independent key tables may be the same key table, but are not necessarily limited thereto. The independent key tables may be fully or partially different from each other depending on the embodiment. Likewise, the variable key tables may be the same key table, but are not necessarily limited thereto. The variable key tables may be fully or partially different from each other depending on the embodiment.

Figure 17:
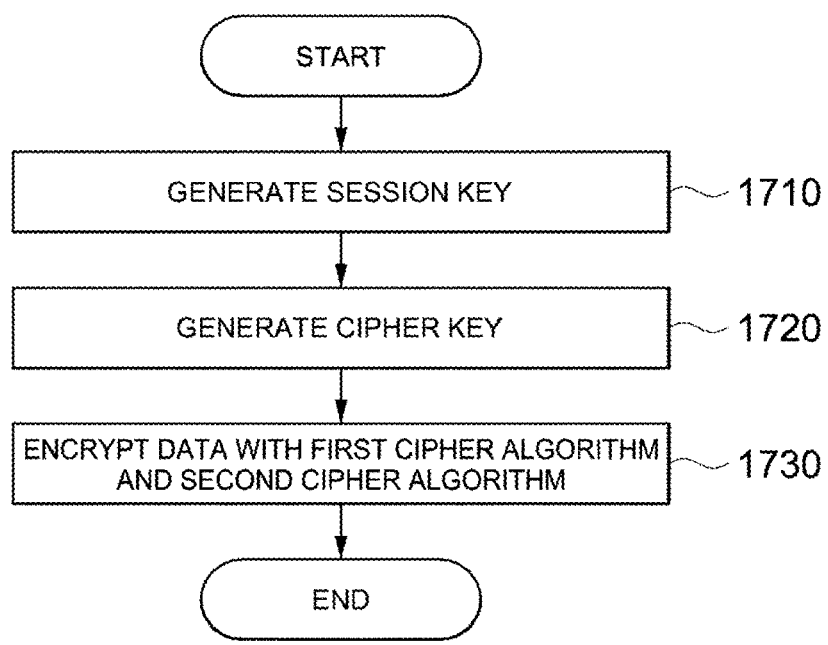
FIG. 17 is a flowchart of a data encryption method according to still another embodiment of the present disclosure.

FIG. 17 is a flowchart of a data encryption method according to still another embodiment of the present disclosure.

For example, the data encryption method shown in FIG. 17 may be performed by the data encryption apparatus 100 shown in FIG. 1.

Referring to FIG. 17, the data encryption apparatus 100 generates a session key using a key exchange protocol (1710).

Subsequently, the data encryption apparatus 100 generates a cipher key from the session key (1720).

Subsequently, the data encryption apparatus 100 encrypts data with a first cipher algorithm that uses a plurality of independent key tables and a second cipher algorithm that uses the generated cipher key (1730).

In this case, according to an embodiment of the present disclosure, the plurality of independent key tables may be the same key table, but are not necessarily limited thereto. The independent key tables may be fully or partially different from each other depending on the embodiment.

Also, according to an embodiment of the present disclosure, the data encryption apparatus 100 may encrypt a seed value or a portion of the data with the first cipher algorithm and may encrypt the other portion of the data, which is not encrypted with the first cipher algorithm, with the second cipher algorithm.

For example, the data encryption apparatus 100 may encrypt the data according to a block cipher operation mode that uses the first cipher algorithm and the second cipher algorithm. In this case, the block cipher operation mode may be configured so that the seed value or the portion of the data, which is encrypted with the first cipher algorithm, is used to encrypt the other portion with the second cipher algorithm.

In the flowcharts shown in FIGS. 14 to 17, the methods have been described as having a plurality of steps. However, at least some of the steps may be performed in the exchanged order, performed in combination with another step, omitted, divided into sub-steps, or performed in addition to one or more steps that are not shown.

Figure 18:
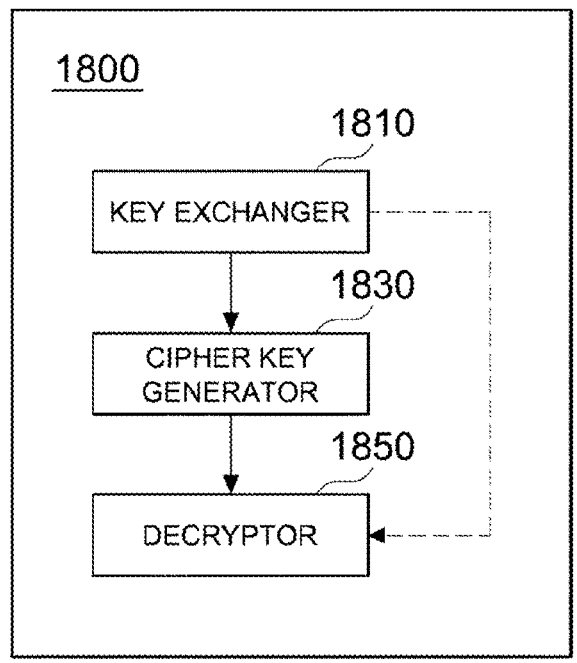
FIG. 18 is a block diagram of a data decryption apparatus according to an embodiment of the present disclosure.

FIG. 18 is a block diagram of a data decryption apparatus 1800 according to an embodiment of the present disclosure.

Referring to FIG. 18, the data decryption apparatus 1800 according to an embodiment of the present disclosure includes a key exchanger 1810, a cipher key generator 1830, and a decryptor 1850.

In the example shown in FIG. 18, the key exchanger 1810 and the cipher key generator 1830 have the same configurations as shown in FIG. 1, and thus their redundant descriptions will be omitted.

The decryptor 1850 decrypts encrypted data with at least one of a key table and a cipher key generated by the cipher key generator 1830.

In detail, according to an embodiment of the present disclosure, the decryptor 1850 may decrypt encrypted data with a first cipher algorithm that performs decryption using a plurality of key tables.

Figure 19:
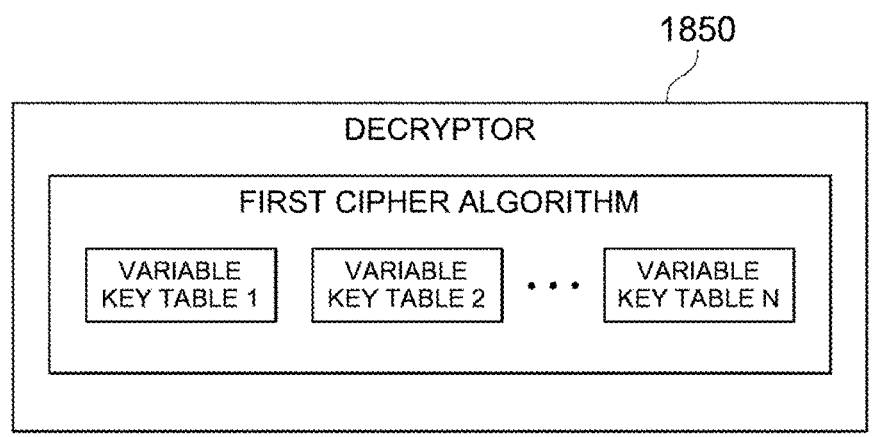
FIG. 19 is a diagram showing an example of a decryption method performed by a decryptor.

FIG. 19 is a diagram showing an example of a decryption method performed by the decryptor 1850.

According to an embodiment of the present disclosure, the decryptor 1850 may decrypt encrypted data with a first cipher algorithm that uses a plurality of variable key tables, as shown in FIG. 19.

In this case, the plurality of variable key tables may be the same key table, but are not necessarily limited thereto. The plurality of variable key tables may be fully or partially different from each other depending on the embodiment.

For example, as shown in FIG. 19, N variable key tables may be all the same as each other. In this case, the cipher key generator 1830 may generate one variable key table from a session key.

As another example, N variable key tables may be different from each other. In this case, the cipher key generator 1830 may generate N variable key tables from a session key.

As still another example, when two of N variable key tables are the same as each other, the cipher key generator 1830 may generate N−1 variable key tables from a session key.

Figure 20:
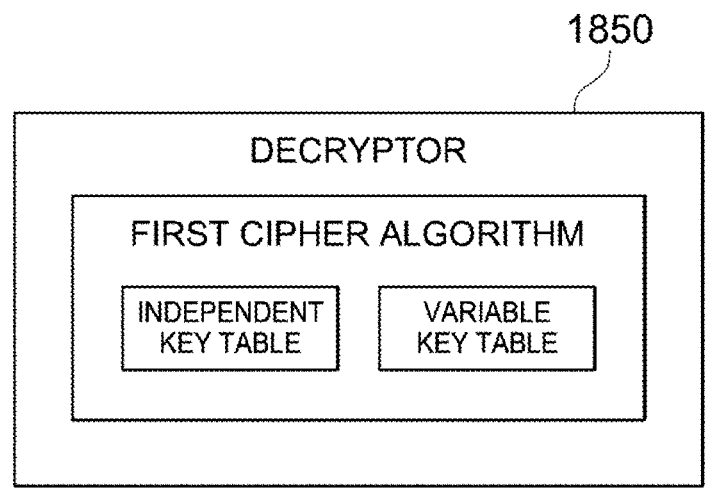
FIG. 20 is a diagram showing another example of a decryption method performed by a decryptor.

FIG. 20 is a diagram showing another example of a decryption method performed by the decryptor 1850.

According to an embodiment of the present disclosure, the decryptor 1850 may decrypt encrypted data with a first cipher algorithm that uses an independent key table and a variable key table, as shown in FIG. 20.

The first cipher algorithm shown in FIG. 20 uses one independent key table and one variable key table, but is not necessarily limited thereto.

For example, the decryptor 1850 may decrypt data with a first cipher algorithm that uses one or more independent key tables and one or more variable key tables, unlike the example shown in FIG. 20.

In this case, the independent key tables may be all the same as each other, but are not necessarily limited thereto. The independent key tables may be fully or partially different from each other depending on the embodiment.

Likewise, the variable key tables may be all the same as each other, but are not limited thereto. The variable key tables may be fully or partially different from each other depending on the embodiment.

Figure 21:
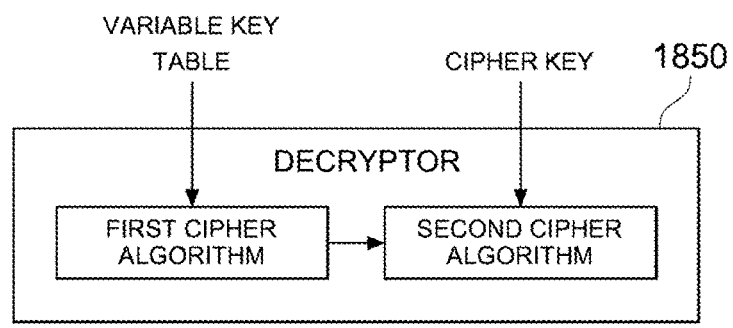
FIG. 21 is a diagram showing still another example of a decryption method performed by a decryptor.

FIG. 21 is a diagram showing still another example of a decryption method performed by the decryptor 1850.

According to an embodiment of the present disclosure, as shown in FIG. 21, the decryptor 1850 may decrypt encrypted data with a first cipher algorithm that uses a plurality of key tables including a variable key table generated by the cipher key generator 1830 and a second cipher algorithm that uses a cipher key generated by the cipher key generator 1830.

In this case, the plurality of key tables used in the first cipher algorithm may include only variable key tables, for example, as shown in FIG. 19.

As another example, the plurality of key tables used in the first cipher algorithm may include an independent key table and a variable key table as shown in FIG. 20.

Figure 22:
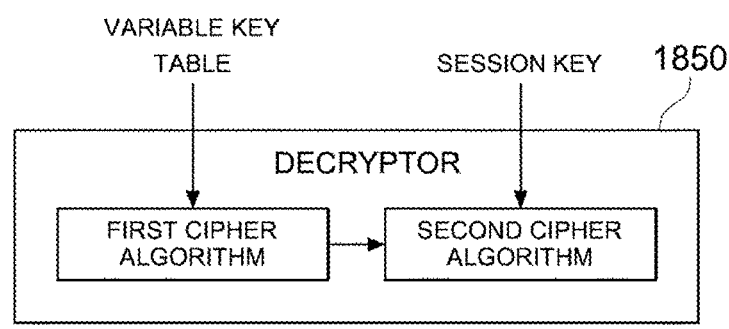
FIG. 22 is a diagram showing still another example of a decryption method performed by a decryptor.

FIG. 22 is a diagram showing still another example of a decryption method performed by the decryptor 1850.

According to an embodiment of the present disclosure, as shown in FIG. 22, the decryptor 1850 may decrypt encrypted data with a first cipher algorithm that uses a plurality of key tables including a variable key table generated by the cipher key generator 1830 and a second cipher algorithm that uses a session key generated by the key exchanger 1810.

In this case, the plurality of key tables used in the first cipher algorithm may include only variable key tables, for example, as shown in FIG. 19.

As another example, the plurality of key tables used in the first cipher algorithm may include an independent key table and a variable key table as shown in FIG. 20.

Figure 23:
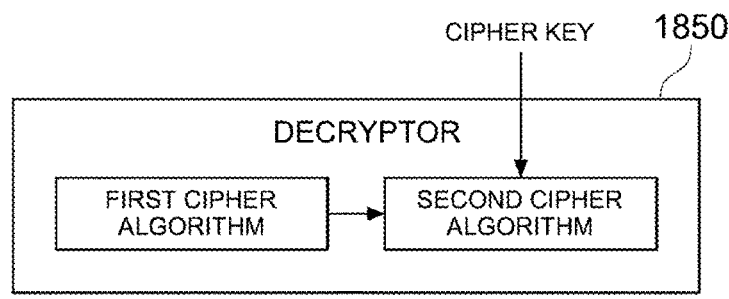
FIG. 23 is a diagram showing still another example of a decryption method performed by a decryptor.

FIG. 23 is a diagram showing still another example of a decryption method performed by the decryptor 1850.

According to an embodiment of the present disclosure, as shown in FIG. 23, the decryptor 1850 may decrypt encrypted data with a first cipher algorithm that uses a plurality of key tables and a second cipher algorithm that uses a cipher key generated by the cipher key generator 1830.

In this case, the plurality of key tables used in the first cipher algorithm may include, for example, only independent key tables. Also, the independent key tables may be all the same as each other, but are not necessarily limited thereto. The independent key tables may be fully or partially different from each other depending on the embodiment.

According to an embodiment of the present disclosure, in the examples shown in FIGS. 21 to 23, the decryptor 1850 may decrypt a portion of encrypted data with the first cipher algorithm and may decrypt the other portion of the encrypted data, which is not decrypted with the first cipher algorithm, with the second cipher algorithm.

Also, according to an embodiment of the present disclosure, the decryptor 1850 may use the portion of the data decrypted with the first cipher algorithm to decrypt the other portion of the data decrypted with the second cipher algorithm.

In detail, the decryptor 1850 may decrypt the encrypted data in units of a block, for example, by using a block cipher operation mode that uses the first cipher algorithm and the second cipher algorithm.

In this case, the block cipher operation mode may be, for example, one of an Electronic Code Book (ECB) mode, a Cipher Block Chaining (CBC) mode, a Propagating Cipher Block Chaining (PCBC) mode, a Cipher FeedBack (CFB) mode, an Output FeedBack (OFB) mode, and a Counter (CTR) mode.

Figure 24:
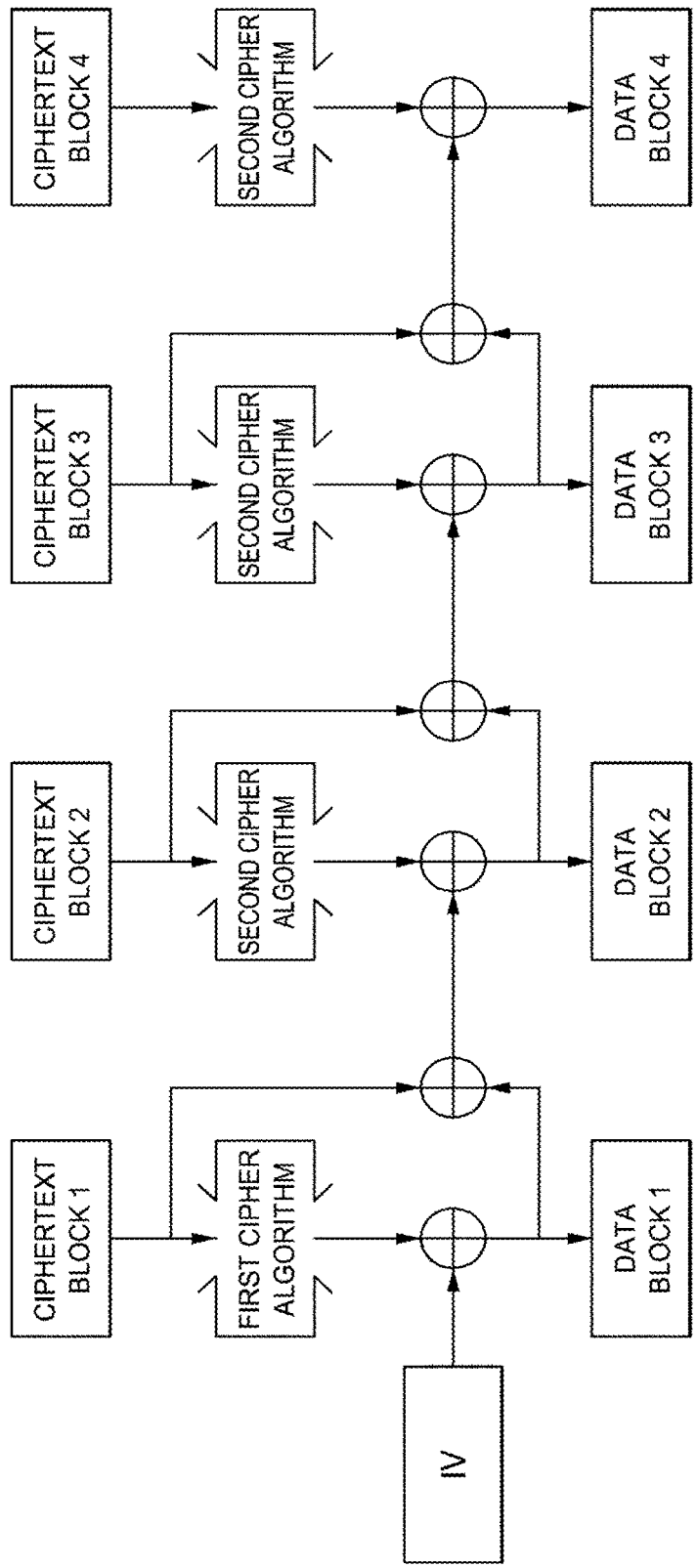
FIG. 24 is a diagram showing an example of decryption using the PCBC mode.

For example, as shown in FIG. 24, the decryptor 1850 may perform decryption in the PCBC mode.

In detail, the example shown in FIG. 24 indicates an example of the PCBC mode for decrypting data encrypted according to the PCBC mode shown in FIG. 11.

Referring to FIG. 24, the decryptor 1850 may apply the first cipher algorithm to a first block of the encrypted data (ciphertext block 1) and then perform an XOR operation between the result and an initialization vector IV to generate data block 1. Subsequently, the decryptor 1850 may apply the second cipher algorithm to each of the remaining blocks of the encrypted data (ciphertext blocks 2 to 4) and then perform an XOR operation between the result and its previous data block and its previous ciphertext block to decrypt the remaining ciphertext blocks.

Figure 25:
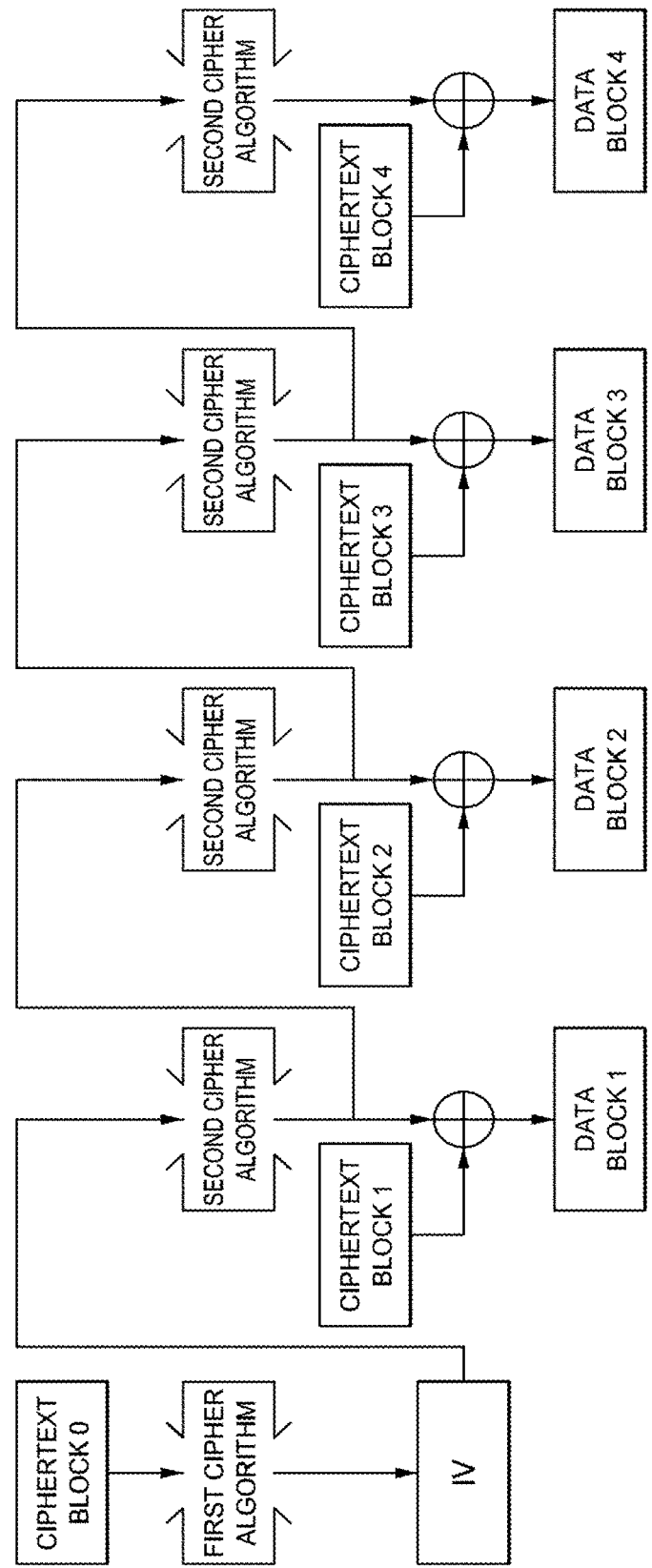
FIG. 25 is a diagram showing an example of decryption using the OFB mode.

As another example, the decryptor 1850 may perform decryption in the OFB mode, as shown in FIG. 25.

In detail, the example shown in FIG. 25 indicates an example of the OFB mode for decrypting data encrypted according to the OFB mode shown in FIG. 12.

Referring to FIG. 25, the decryptor 1850 may apply the first cipher algorithm to a first block of the encrypted data (ciphertext block 0) to generate the initialization vector IV. Subsequently, the decryptor 1850 may apply the second cipher algorithm to the generated initialization vector IV to generate a first output block and then perform an XOR operation between the output block and a second block of the encrypted data (ciphertext block 1) to generate data block 1.

Subsequently, the decryptor 1850 may apply the second cipher algorithm to an $(i-1)^{th}$ output block to generate an $i^{th}$ output block and then perform an XOR operation between the $i^{th}$ output block and an $i^{th}$ block of the encrypted data to generate an $i^{th}$ data block.

Figure 26:
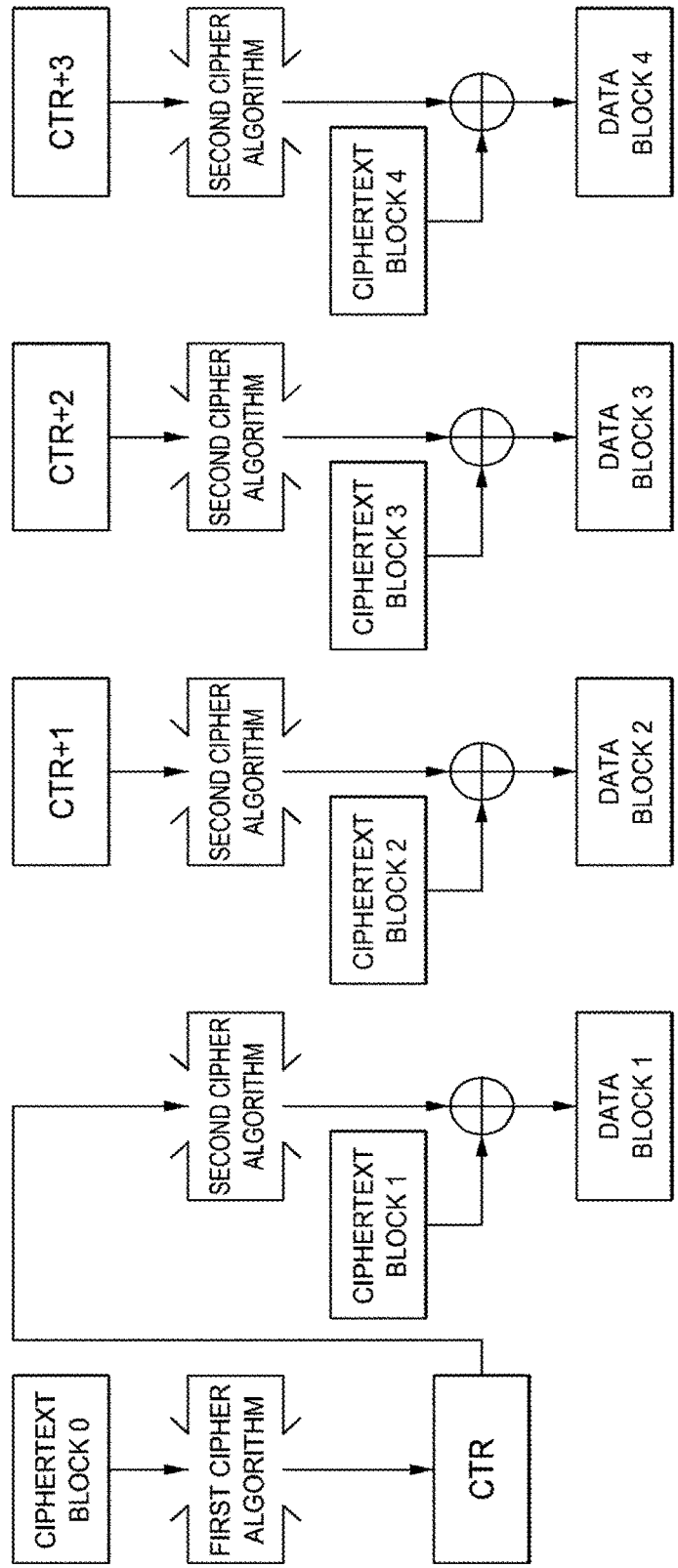
FIG. 26 is a diagram showing an example of decryption using the CTR mode.

As still another example, the decryptor 1850 may perform decryption in the CTR mode, as shown in FIG. 26.

In detail, the example shown in FIG. 26 indicates an example of the CTR mode for decrypting data encrypted according to the CTR mode shown in FIG. 13.

Referring to FIG. 26, the decryptor 1850 may apply the first cipher algorithm to the first block of the encrypted data (ciphertext block 0) to generate the initial counter value CRT.

Subsequently, the decryptor 1850 may apply the second cipher algorithm to the generated initial counter value CTR and then perform an XOR operation between the result and the second block of the encrypted data (ciphertext block 1) to generate data block 1.

Subsequently, the decryptor 1850 may apply the second cipher algorithm to an $i^{th}$ counter value (i.e., CTR+i−1) and then perform an XOR operation between the result and the $i^{th}$ block of the encrypted data to generate an $i^{th}$ data block.

The operation modes shown in FIGS. 24 to 26 are illustrative and thus are not necessarily limited to the shown examples. Accordingly, the operation modes may be modified in various ways other than the shown examples.

In an embodiment of the present disclosure, the key exchanger 1810, the cipher key generator 1830, and the decryptor 1850 may be implemented in a computing apparatus including at least one processor and a computer-readable recording medium connected with the processor. The computer-readable recording medium may be disposed inside or outside the processor, and may be connected with the processor using various well-known means. The processor in the computing apparatus may enable the computing apparatus to operate according an example embodiment described in this specification. For example, the processor may execute an instruction stored in the computer-readable recording medium, and the instruction stored in the computer-readable recording medium may be configured to enable the computing apparatus to perform operations according to an example embodiment described in this specification when the instruction is executed by the processor.

Figure 27:
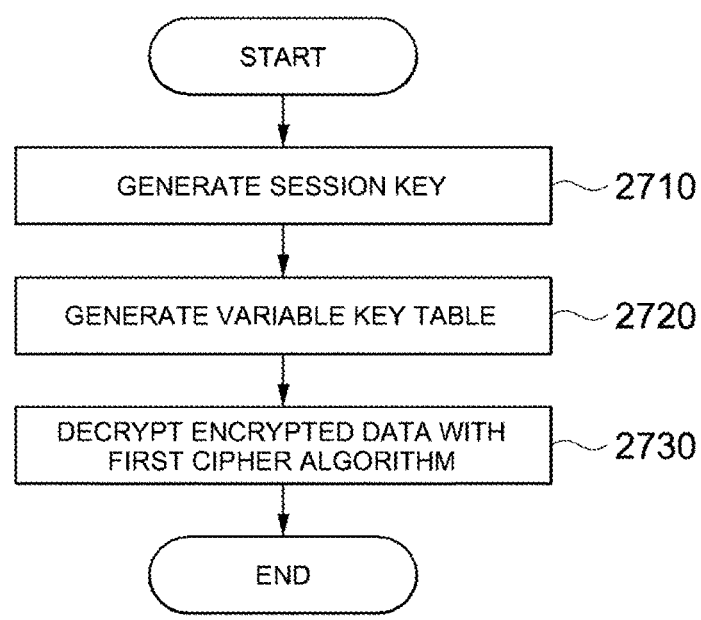
FIG. 27 is a flowchart of a data decryption method according to an embodiment of the present disclosure.

FIG. 27 is a flowchart of a data decryption method according to an embodiment of the present disclosure.

For example, the data decryption method shown in FIG. 27 may be performed by the data decryption apparatus 1800 shown in FIG. 18.

Referring to FIG. 27, the data decryption apparatus 1800 generates a session key using a key exchange protocol (2710).

Subsequently, the data decryption apparatus 1800 generates a variable key table from the session key (2720).

Subsequently, the data decryption apparatus 1800 decrypts encrypted data with a first cipher algorithm that uses a plurality of key table including the generated variable key table (2730).

According to an embodiment of the present disclosure, the plurality of key tables may include only variable key tables.

In this case, the variable key tables may be all the same as each other, but are not necessarily limited thereto. The variable key tables may be fully or partially different from each other depending on the embodiment.

According to another embodiment of the present disclosure, the plurality of key tables may include one or more independent key tables and one or more variable key tables.

In this case, the independent key tables may be the same key table, but are not necessarily limited thereto. The independent key tables may be fully or partially different from each other depending on the embodiment.

Likewise, the variable key tables may be the same key table, but are not necessarily limited thereto. The variable key tables may be fully or partially different from each other depending on the embodiment.

Figure 28:
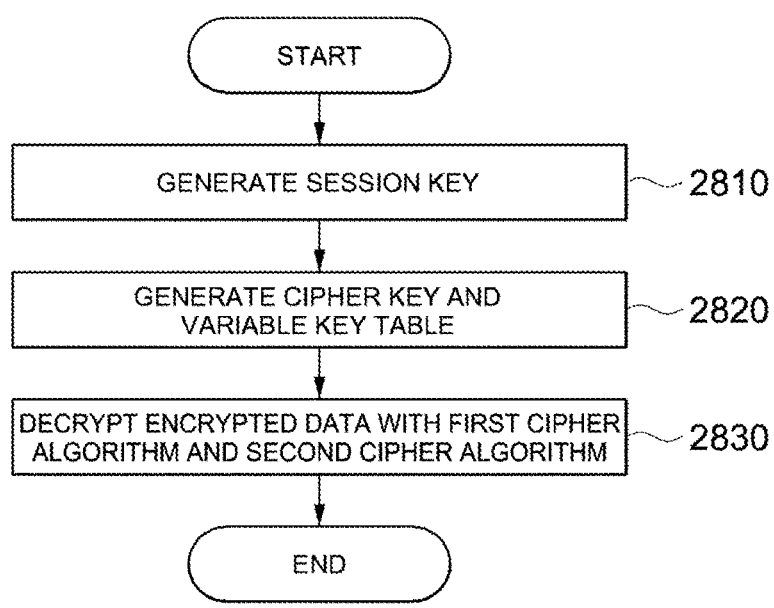
FIG. 28 is a flowchart of a data decryption method according to another embodiment of the present disclosure.

FIG. 28 is a flowchart of a data decryption method according to another embodiment of the present disclosure.

For example, the data decryption method shown in FIG. 28 may be performed by the data decryption apparatus 1800 shown in FIG. 18.

Referring to FIG. 28, the data decryption apparatus 1800 generates a session key using a key exchange protocol (2810).

Subsequently, the data decryption apparatus 1800 generates a cipher key and a variable key table from the session key (2820).

Subsequently, the data decryption apparatus 1800 decrypts encrypted data with a first cipher algorithm that uses a plurality of key tables including the generated variable key table and a second cipher algorithm that uses the generated cipher key (2830).

In detail, according to an embodiment of the present disclosure, the data decryption apparatus 1800 may decrypt a portion of the encrypted data with the first cipher algorithm and may decrypt the other portion of the encrypted data, which is not decrypted with the first cipher algorithm, with the second cipher algorithm.

For example, the data decryption apparatus 1800 may decrypt the data according to a block cipher operation mode that uses the first cipher algorithm and the second cipher algorithm. In this case, the block cipher operation mode may be configured so that the portion of the data, which is decrypted with the first cipher algorithm, is used to decrypt the other portion with the second cipher algorithm.

For example, the data decryption apparatus 1800 may decrypt the portion of the encrypted data with a first cipher algorithm that uses a plurality of variable key tables.

In this case, the plurality of variable key tables may be the same key table, but are not necessarily limited thereto. The plurality of variable key tables may be fully or partially different from each other depending on the embodiment.

As another example, the data decryption apparatus 1800 may decrypt the portion of the encrypted data with a first cipher algorithm that uses one or more independent key tables and one or more variable key tables.

In this case, the independent key tables may be the same key table, but are not necessarily limited thereto. The independent key tables may be fully or partially different from each other depending on the embodiment.

Likewise, the variable key tables may be the same key table, but are not necessarily limited thereto. The variable key tables may be fully or partially different from each other depending on the embodiment.

Figure 29:
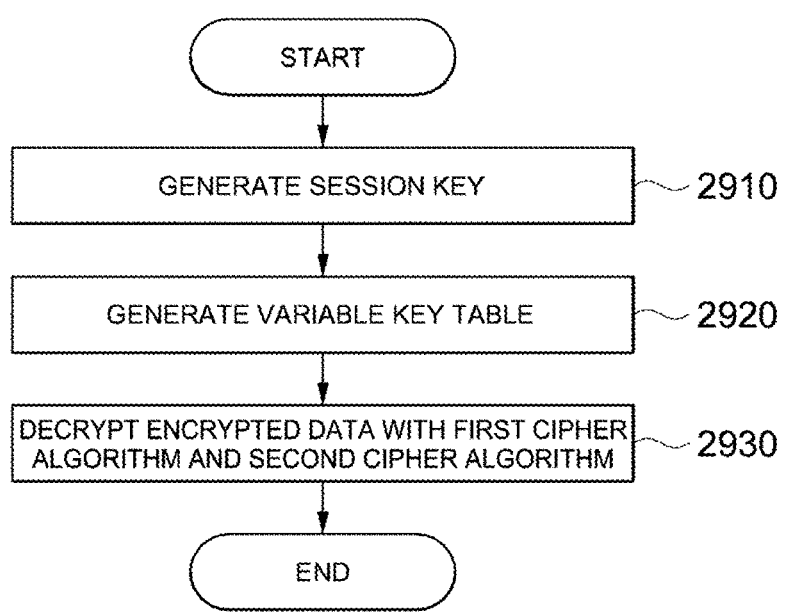
FIG. 29 is a flowchart of a data decryption method according to still another embodiment of the present disclosure.

FIG. 29 is a flowchart of a data decryption method according to still another embodiment of the present disclosure.

For example, the data decryption method shown in FIG. 29 may be performed by the data decryption apparatus 1800 shown in FIG. 18.

Referring to FIG. 29, the data decryption apparatus 1800 generates a session key using a key exchange protocol (2910).

Subsequently, the data decryption apparatus 1800 generates a variable key table from the session key (2920).

Subsequently, the data decryption apparatus 1800 decrypts encrypted data with a first cipher algorithm that uses a plurality of key tables including the generated variable key table and a second cipher algorithm that uses the generated session key (2930).

According to an embodiment of the present disclosure, the data decryption apparatus 1800 may decrypt a portion of the encrypted data with the first cipher algorithm and may decrypt the other portion of the encrypted data, which is not decrypted with the first cipher algorithm, with the second cipher algorithm.

For example, the data decryption apparatus 1800 may decrypt the encrypted data according to a block cipher operation mode that uses the first cipher algorithm and the second cipher algorithm. In this case, the block cipher operation mode may be configured so that the portion of the data, which is decrypted with the first cipher algorithm, is used to decrypt the other portion with the second cipher algorithm.

For example, the data decryption apparatus 1800 may decrypt the portion of the encrypted data with a first cipher algorithm that uses a plurality of variable key tables.

In this case, the plurality of variable key tables may be the same key table, but are not necessarily limited thereto. The plurality of variable key tables may be fully or partially different from each other depending on the embodiment.

As another example, the data decryption apparatus 1800 may decrypt the portion of the encrypted data with a first cipher algorithm that uses one or more independent key tables and one or more variable key tables.

In this case, the independent key tables may be the same key table, but are not necessarily limited thereto. The independent key tables may be fully or partially different from each other depending on the embodiment.

Likewise, the variable key tables may be the same key table, but are not necessarily limited thereto. The variable key tables may be fully or partially different from each other depending on the embodiment.

Figure 30:
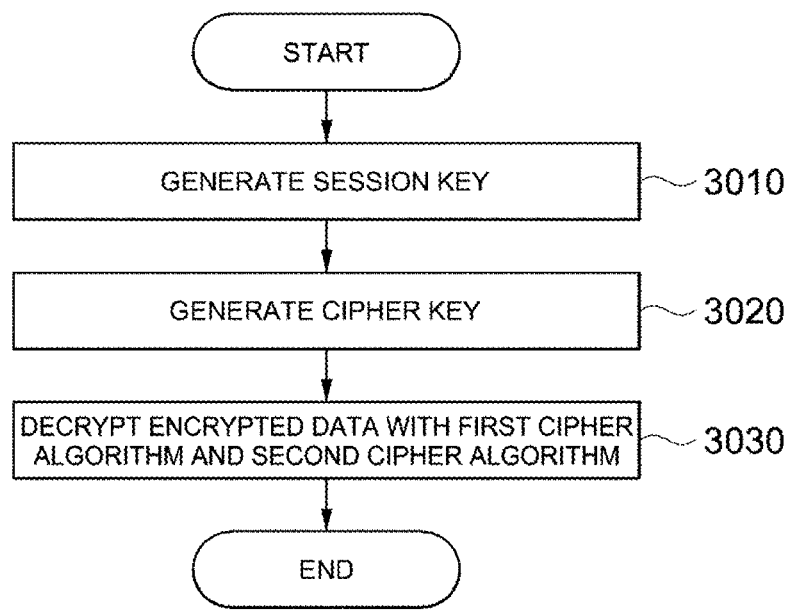
FIG. 30 is a flowchart of a data decryption method according to still another embodiment of the present disclosure.

FIG. 30 is a flowchart of a data decryption method according to still another embodiment of the present disclosure.

For example, the data decryption method shown in FIG. 30 may be performed by the data decryption apparatus 1800 shown in FIG. 18.

Referring to FIG. 30, the data decryption apparatus 1800 generates a session key using a key exchange protocol (3010).

Subsequently, the data decryption apparatus 1800 generates a cipher key from the session key (3020).

Subsequently, the data decryption apparatus 1800 decrypts encrypted data with a first cipher algorithm that uses a plurality of independent key tables and a second cipher algorithm that uses the generated cipher key (3030).

In this case, according to an embodiment of the present disclosure, the plurality of independent key tables may be the same key table, but are not necessarily limited thereto. The independent key tables may be fully or partially different from each other depending on the embodiment.

Also, according to an embodiment of the present disclosure, the data decryption apparatus 1800 may decrypt a portion of the encrypted data with the first cipher algorithm and may decrypt the other portion of the encrypted data, which is not decrypted with the first cipher algorithm, with the second cipher algorithm.

For example, the data decryption apparatus 1800 may decrypt the encrypted data according to a block cipher operation mode that uses the first cipher algorithm and the second cipher algorithm. In this case, the block cipher operation mode may be configured so that the portion of the data, which is decrypted with the first cipher algorithm, is used to decrypt the other portion with the second cipher algorithm.

In the flowcharts shown in FIGS. 27 to 30, the method has been described as having a plurality of steps. However, at least some of the steps may be performed in the exchanged order, performed in combination with another step, omitted, divided into sub-steps, or performed in addition to one or more steps that are not shown.

Embodiments of the present disclosure may include a computer-readable recording medium including a program for executing the methods described herein on a computer. The computer-readable recording medium may include any one or a combination of a program instruction, a local data file, a local data structure, etc. The medium may be designed and configured specifically for the present disclosure or can be typically available in the field of computer software. Examples of the computer-readable recording medium include a magnetic medium, such as a hard disk, a floppy disk, and a magnetic tape, an optical recording medium, such as a CD-ROM and a DVD, a magneto-optical medium, such as a floptical disk, and a hardware device specially configured to store and perform a program instruction, such as a ROM, a RAM, and a flash memory. Examples of the program instruction may include a machine code generated by a compiler and a high-level language code that can be executed in a computer using an interpreter.

According to embodiments of the present disclosure, by encrypting data with at least one of a key table and an cipher key generated from a session key generated for each session, it is possible to secure confidentiality of the data even when the session key is revealed.

Furthermore, by encrypting data with two types of cipher algorithms and also using a cipher key having different attributes through each algorithm, it is possible to further enhance confidentiality of the data.

Although example embodiments of the present disclosure have been described in detail, it will be understood by those skilled in the art that various changes may be made without departing from the spirit or scope of the present disclosure. Thus, the scope of the present disclosure is to be determined by the following claims and their equivalents, and shall not be restricted or limited by the foregoing detailed description.

What is claimed is:

1. A data encryption apparatus comprising:
   at least one hardware processor of an integrated circuit configured to implement:
      a key exchanger configured to generate a session key using a key exchange protocol;
      a cipher key generator configured to generate a cipher key and a key table based on the session key; and
      an encryptor configured to encrypt data with the cipher key and the key table generated from the session key,
   wherein the encryptor is further configured to encrypt at least a portion of the data with a first cipher algorithm that uses a plurality of key tables which comprises the key table generated from the session key, and
   wherein the encryptor is further configured to encrypt a seed value for encrypting the portion of the data with the first cipher algorithm and encrypt a remaining portion of the data, which is not encrypted with the first cipher algorithm, with a second cipher algorithm that uses the cipher key.

2. The data encryption apparatus of claim 1, wherein the plurality of key tables further comprises a key table independent of the session key.

3. The data encryption apparatus of claim 1, wherein the encryptor is further configured to use the portion of the data or the seed value to encrypt the remaining portion.

4. A data encryption method performed by at least one hardware processor of an integrated circuit, the data encryption method comprising:
   generating a session key using a key exchange protocol;
   generating a cipher key and a key table from the session key; and
   encrypting data with the cipher key and the key table generated from the session key,
   wherein the encrypting comprises:
      encrypting at least a portion of the data with a first cipher algorithm that uses a plurality of key tables which comprises the key table generated from the session key
      encrypting a seed value for encrypting the portion of the data with the first cipher algorithm and encrypt a remaining portion of the data, which is not encrypted with the first cipher algorithm, with a second cipher algorithm that uses the cipher key.

5. The data encryption method of claim 4, wherein the plurality of key tables further comprises a key table independent of the session key.

6. The data encryption method of claim 4, wherein the encrypting comprises using the portion of the data or the seed value to encrypt the remaining portion.

7. A data decryption apparatus comprising:
   at least one hardware processor of an integrated circuit configured to implement:
      a key exchanger configured to generate a session key using a key exchange protocol;

a cipher key generator configured to generate a cipher key and a key table from the session key; and a decryptor configured to decrypt encrypted data with the cipher key and the key table generated from the session key, wherein the decryptor is further configured to decrypt a portion of the encrypted data with a first cipher algorithm that uses a plurality of key tables which comprises the key table generated from the session key, and wherein the decryptor is further configured to decrypt a portion of the encrypted data with the first cipher algorithm and decrypt a remaining portion of the encrypted data, which is not decrypted with the first cipher algorithm, with a second cipher algorithm that uses the cipher key.

8. The data decryption apparatus of claim 7, wherein the plurality of key tables further comprises a key table independent of the session key.

9. The data decryption apparatus of claim 7, wherein the decryptor is further configured to use the portion of the data decrypted with the first cipher algorithm to decrypt the remaining portion.

10. A data decryption method performed by at least one hardware processor of an integrated circuit, the data decryption method comprising:

generating a session key using a key exchange protocol;

generating a cipher key and a key table from the session key; and decrypting encrypted data with the cipher key and the key table generated from the session key, wherein the decrypting comprises:

decrypting a portion of the encrypted data with a first cipher algorithm that uses a plurality of key tables which comprises the key table generated from the session key, and decrypting a portion of the encrypted data with the first cipher algorithm and decrypt a remaining portion of the encrypted data, which is not decrypted with the first cipher algorithm, with a second cipher algorithm that uses the cipher key.

11. The data decryption method of claim 10, wherein the plurality of key tables further comprises a key table independent of the session key.

12. The data decryption method of claim 10, wherein the decrypting comprises using the portion of the data decrypted with the first cipher algorithm to decrypt the remaining portion.

* * * * *